Figure 1:
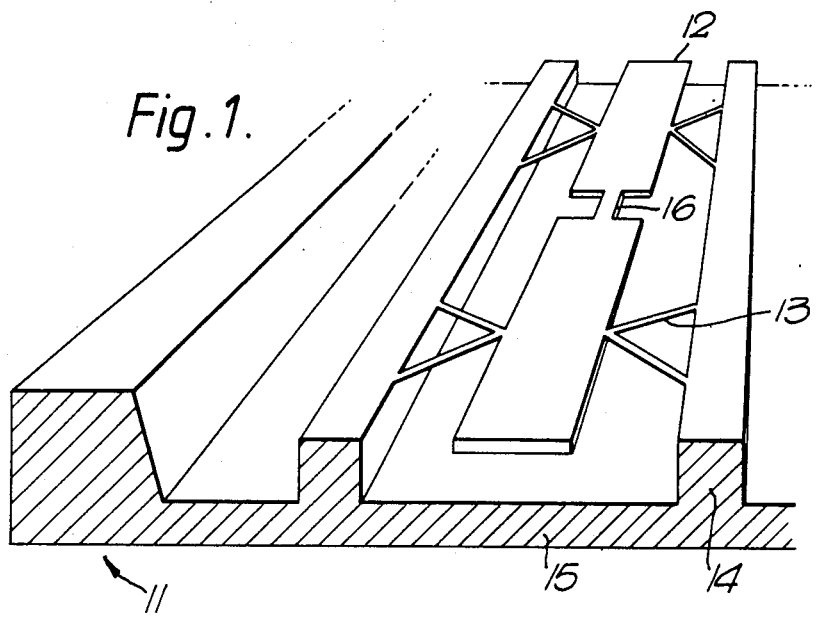

United States Patent [19]
Greenwood

[11] Patent Number: 4,813,271
[45] Date of Patent: Mar. 21, 1989

[54] RESONATOR DEVICE

[75] Inventor: John C. Greenwood, Harlow, Great Britain

[73] Assignee: STC PLC, London, England

[21] Appl. No.: 33,806

[22] Filed: Apr. 3, 1987

[30] Foreign Application Priority Data

Apr. 26, 1986 [GB] United Kingdom ............... 8610253

[51] Int. Cl.[4] .................. G01L 11/00; G01L 9/00; G01L 1/00
[52] U.S. Cl. ..................... 73/702; 73/DIG. 1; 73/723; 73/778
[58] Field of Search .............. 73/773, 778, 517 AV, 73/DIG. 1, 862.59, 862.41, 580, 581, 702, 703, 704, 715, 760, 800, 705, 723; 356/32, 35.5; 331/156, 155

[56] References Cited

U.S. PATENT DOCUMENTS

| | | | |
|---|---|---|---|
| 4,503,715 | 3/1985 | Greenwood | 73/DIG. 1 |
| 4,567,395 | 1/1986 | Pundarika | 73/715 |
| 4,567,451 | 1/1986 | Greenwood | 73/862.41 |
| 4,614,119 | 9/1986 | Zavracky et al. | 73/704 |

FOREIGN PATENT DOCUMENTS

| | | | |
|---|---|---|---|
| 2563626 | 10/1985 | France | 73/581 |
| 0115336 | 7/1983 | Japan | 73/705 |
| 0128405 | 7/1984 | Japan | 73/581 |
| 2146120 | 4/1985 | United Kingdom | 73/862.59 |
| 2162314 | 1/1986 | United Kingdom | 73/862.59 |

*Primary Examiner*—Michael J. Tokar
*Assistant Examiner*—Robert R. Raevis
*Attorney, Agent, or Firm*—Lee & Smith

[57] ABSTRACT

A strain or pressure responsive transducer comprises a pair of elongate beam resonators arranged end to end and provided with a flexible coupling therebetween. The arrangement oscillates e.g. in a double see-saw or butterfly mode. The transducer is disposed on a diaphragm whereby strain may be transmitted to the oscillatory system. The frequency of oscillation is a function of this strain.

5 Claims, 4 Drawing Sheets

RESONATOR DEVICE

This invention relates to resonator devices, and in particular to mechanically resonant sensors, e.g. for pressure sensing.

The need for accurate, low cost compact sensors to complement control and measurement electronic systems is becoming widely appreciated. In an attempt to satisfy this need a number of mechanically resonant sensors formed from single crystal silicon have been developed. Sensors of this type are for example described in our UK specifications No. 2,162,314 A (J.C. Greenwood - D. Wilson 59-7X) and 2,115,551 (J.C. Greenwood 44). In these devices a reasonating element is maintained in a state of oscillation, the oscillation frequency providing a measure of a pressure or strain applied to the transducer. Whilst these prior art devices are suitable for many applications, they do not have sufficient accuracy where a high degree of precision is required, e.g. in high accuracy altimeter applications. The major source of inaccuracy in conventional transducers is that the resonant frequencies varies with oscillation amplitude. This problem can be significantly reduced by the use of devices having a torsional mode of vibration which allows a relatively large displacement for a given amount of stretch stiffening. The introduction of such devices has however been inhibited by the lack of a suitable drive system whereby oscillation is maintained.

A further problem with conventional devices is that they generally have a number of oscillating modes often of similar frequency. Mixing of these modes will clearly have a sensor effect on the Q-factor and the accuracy of the device.

The object of the present invention is to minimise or to overcome this disadvantage.

According to the invention there is provided a strain or pressure responsive mechanically resonant sensor device, the device including first and second elongate members coupled at their one ends via a flexible coupling and each supported on respective stretched filaments so as, in use, to oscillate together each in an identical mode at their natural, resonant frequency.

According to the invention there is further provided a strain or pressure responsive mechanically resonant sensor device, the device including a rigid frame having an opening across which a flexible diaphragm is supported, first and second elongate means extending from said diaphragm and disposed in a parallel configuration, first and second elongate members disposed end to end between the means and each supported adjacent its transverse axis by filaments extending from the mesas, a flexible coupling linking the adjacent ends of the elongate members, and optimal means for applying energy to the coupling whereby, in use, the elongate members are driven into coupled oscillation each in an identical mode at their natural resonant frequency.

The device is particularly suitable for pressure measurement applications, e.g. in well logging or in altimetry.

By using two coupled oscillatory members a device is provided in which the resonant frequency is substantially independent of amplitude and for which there are only a limited number of well defined oscillatory nodes.

Figure 2:
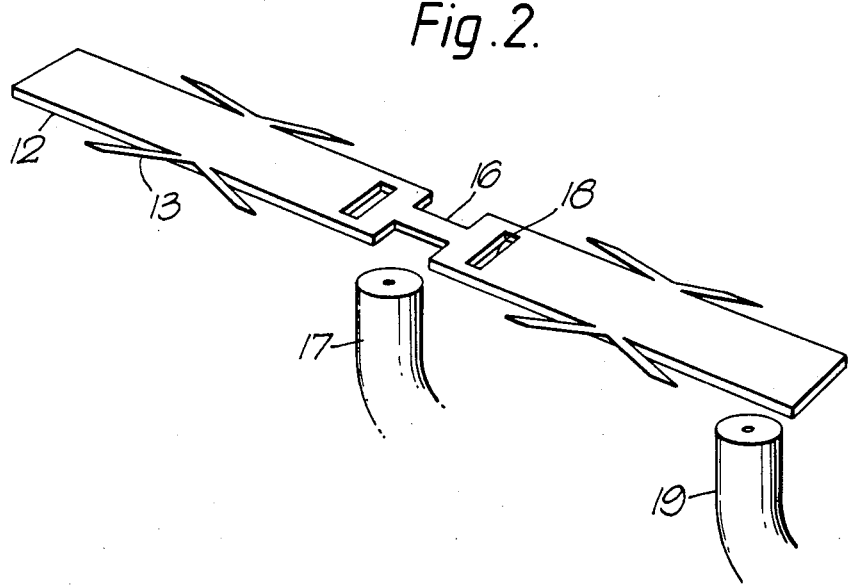
Figure 3:
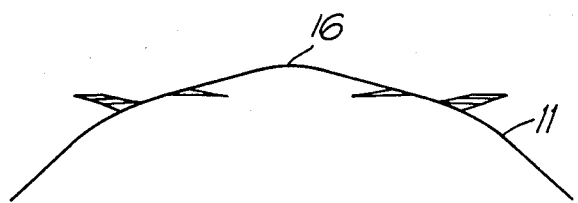
Figure 4:
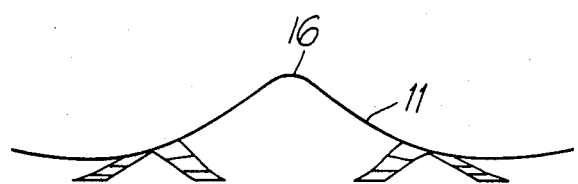
Figure 5:
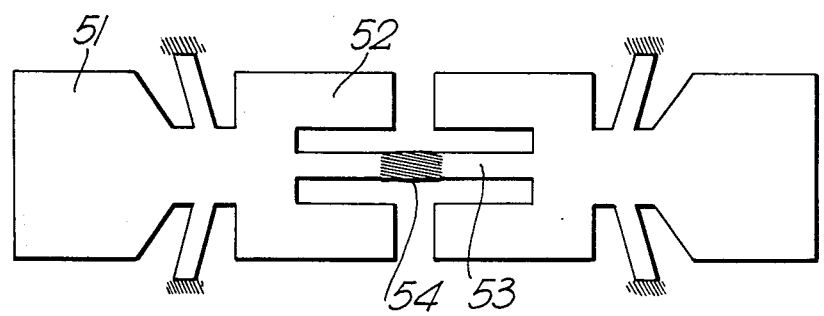
Figure 6:
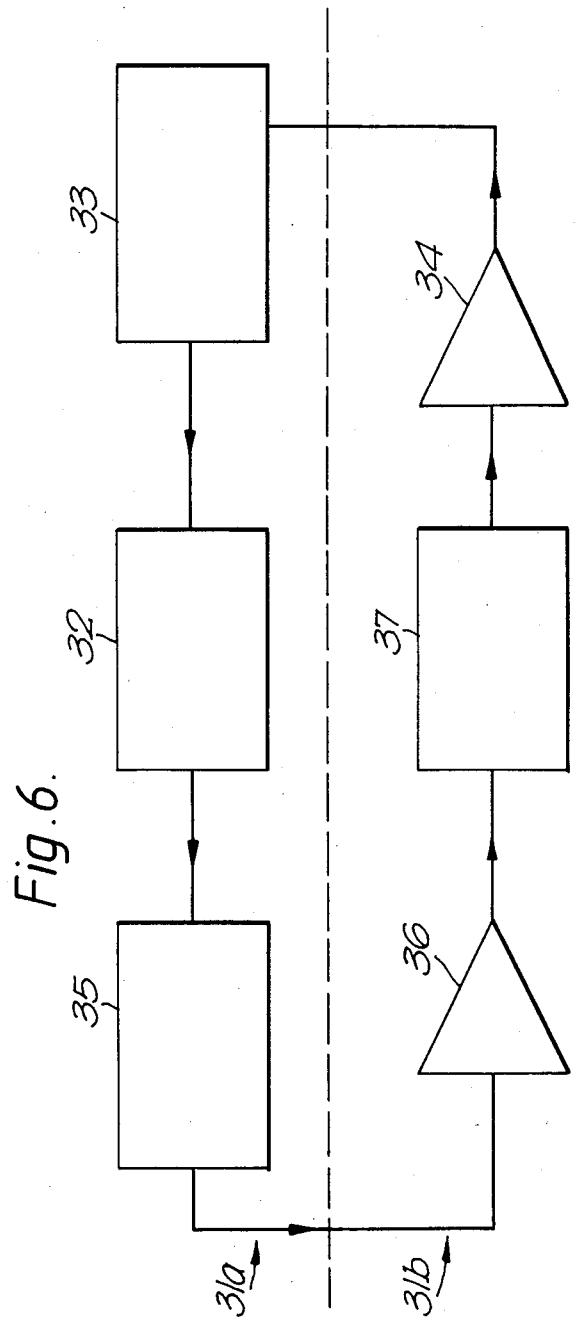
Figure 7:
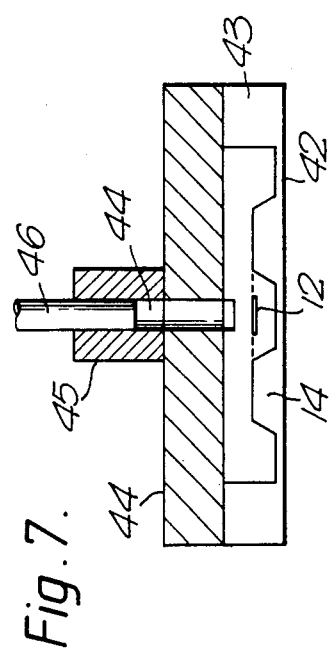
Figure 8:
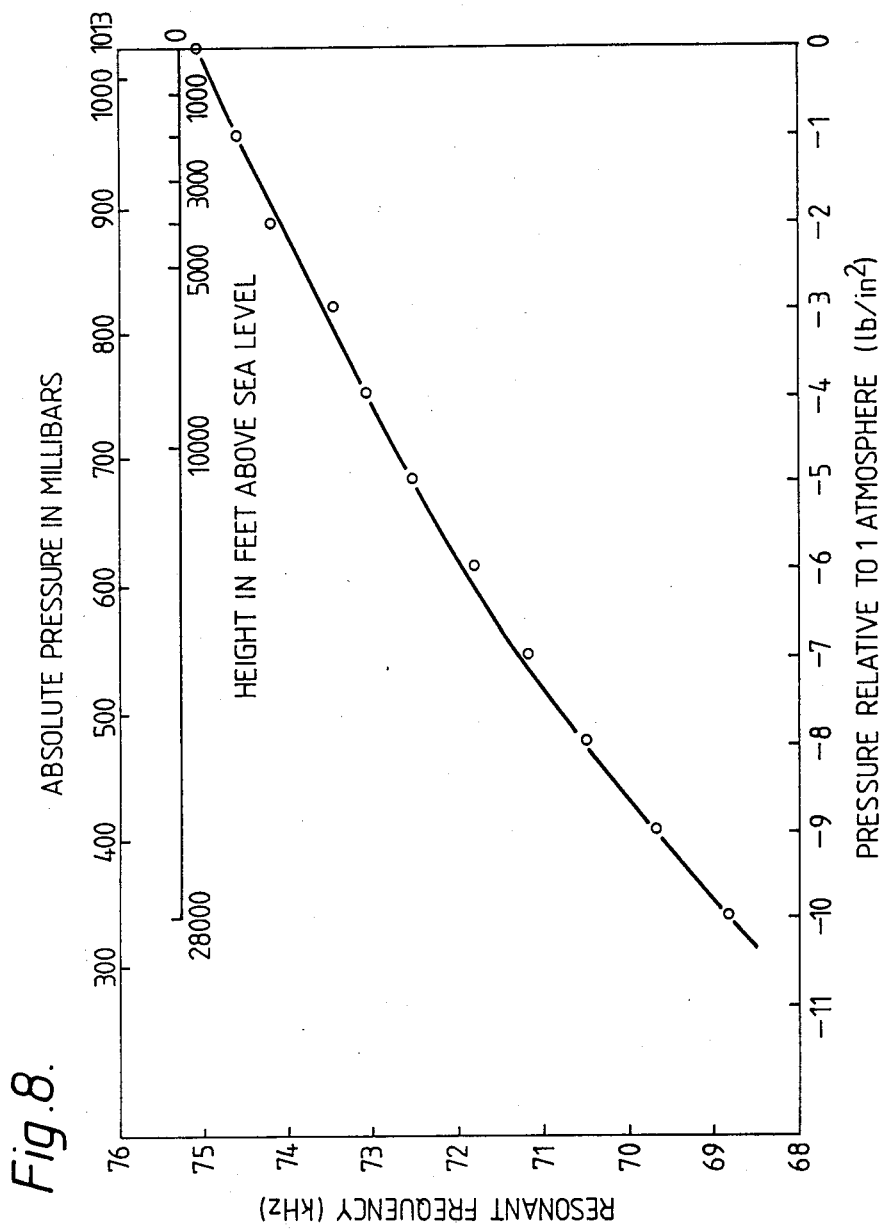

An embodiment of the invention will now be described with reference to the accompanying drawings in which:

FIG. 1 is a general view of the sensor device;
FIG. 2 shows the oscillatory parts of the sensor of FIG. 1;
FIGS. 3 and 4 illustrate two principal modes of vibration of the sensor device of FIGS. 1 and 2;
FIG. 5 shows in schematic form an alternative sensor construction;
FIG. 6 is a schematic diagram of an oscillation maintaining circuit for use with the sensor of FIGS. 1 and 2 or FIG. 5;
FIG. 7 is a sectional view of a pressure sensor head employing the sensor device of FIGS. 1 & 2;
and FIG. 8 illustrates the relationship between resonant frequency and applied pressure for the sensor of FIGS. 1 and 2.

Referring to FIGS. 1 and 2, the sensor includes a substrate body 11 on which a pair of elongate members 12 are supported on taut filaments 13. Typically the filaments are anchored on elongate mesas 14 extending from a flexible diaphragm 15 forming a part of the substrate 11. The elongate members 12 are disposed end to end in a colinear configuration and are linked at their adjacent ends by a flexible coupling 16. The elongate members 12 are movable each about its transverse axis against the torsional constraint of the supporting filaments 13. The coupling 16 ensures that the members 12 move together and in antiphase. In use the members 12 oscillate each in an identical mode, the frequency of oscillation being a function of the tension in the filaments 13 and the moment of inertia of each member 12.

Oscillation of the system at its resonant frequency is maintained by selectively supplying energy to the coupling 16 between the ends of the member 12. This may be effected via an optical fibre 17 the free end of which is disposed adjacent the coupling 16. High intensity infra-red pulses, e.g. from a laser (not shown) are directed on to the coupling. Each pulse causes a momentary thermal expansion of the coupling 16 and thus provides an oscillation maintaining impulse to the two members 12 thus maintaining the system in a state of torsional oscillation. Preferably the members 12 are each provided with an opening or cut-out 18 adjacent the coupling 16 to improve flexibility of the coupling and thus improve the Q value of the oscillatory system.

Detection of the vibration, and consequent synchronisation of the drive pulses, may be achieved by modulation of reflected laser light by movement of the resonator. For example, movement of the resonator may be detected from light reflected back down a further fibre 19 disposed adjacent a free end of one of the elongate members. A Fabry-Perot interferometer is formed between the end of the fiber 19 and the surface of the member 12 so that a steady light input is modulated by the varying reflectance. This modulation is detected, amplified and used to provide the optical drive. In some applications this further fibre 19 may be dispensed with and the fibre 17 used to perform the dual function of driving the resonator and carrying the modulator return signal. The device is not of course limited to optical detection of resonance and other techniques, e.g. capacitive coupling to the resonator, can be used.

The resonator of FIGS. 1 and 2 has two symmetrical modes of oscillation, these being illustrated in FIGS. 3 and 4 respectively. In the first mode shown in FIG. 3 there is significant rotation of each elongate member 12 about its respective support filaments 13 in a see-saw action. In the second mode shown in FIG. 4 there is little rotation of the members 12 about the support filaments. In this second mode the two ends of each member 12 move up or down in phase. This second mode has been found to have a higher stress sensitivity than the first mode. However the first mode is preferred as it has a better dynamic balance and thus provides a superior performance.

In the modified sensor of FIG. 5 each oscillatory member 51 has its inner end 52 formed in a U-shape. The members 51 are mechanically coupled via an elongate rigid member 53 having a flexible central portion 54 and extending from the base of each U-shaped end. This structure has been found to favour the first mode of vibration shown in FIG. 3.

A suitable drive circuit for the system is shown in FIG. 6. The drive circuit incorporates an optical portion 31a and an electronic portion 31b. Optical power to the resonator 32 is provided by laser 33 driven by a power amplifier 34. The modulated output from the resonator is converted into an electrical signal by photodetector 35 and is then fed via a preamplifier 36 to a gain control (AGC) circuit 37. Typically the preamplifier 36 comprises a junction field effect transistor. The AGC output is then fed to the power amplifier 34 thus completing the feedback loop. To ensure oscillation of the loop at the resonant frequency the input and output signals to and from the resonator are in phase. This phase relationship is provided either by the amplifier or by an additional phase control circuit (not shown) in the loop.

The sensor may be used on a pressure sensor, e.g. in an aircraft altimeter, by mounting the assembly in a housing whereby the pressure to be measured is compared with a reference pressure. Typically this reference pressure is a vacuum. A suitable sensor head construction is shown in FIG. 7. In this construction the sensor 41 is of integral construction and has a diaphragm 42 supported by a peripheral frame 43. For the measurement of high pressures, e.g. for well logging, the diaphragm 42 may be attached to a relatively rigid auxiliary diaphragm (not shown). A housing member 44 is secured to the frame 43, e.g. by an adhesive, and the chamber thus formed is evacuated. The oscillatory members 12 of the sensor are mounted on the sensors 14 which mesas are in turn supported on the diaphragm. Optical signals are carried to and from the sensor via an optical fibre stub 44 terminated in a connector 45 whereby transmission to and from the remote station is effected via fibre 46. A pressure differential across the diaphragm distorts the diaphragm causing strain to be applied to the sensor and in particular to the filaments 13. The resonant frequency of the sensor is a function of this strain and, as shown in FIG. 8, approximates to a linear relationship. Typically the resonator has a Q factor of 5,000 to 10,000 and a natural frequency of 50 to 150kHz. For example, we have found that a resonator in which the combined lengths of the members 12 was 1 mm had a resonant frequency of 116kHz at an applied pressure differential of 1 atmosphere and a frequency of 85kHz for a zero pressure differential.

Advantageously the sensor of FIGS. 1 and 2 or FIG. 5 is formed by selective etching from a body of single crystal silicon. The silicon is first doped with an etch stop, e.g. boron, and is then exposed to an anisotropic etch to remove unwanted silicon, thereby defining the structure.

I claim:

1. A strain or pressure responsive mechanically resonant sensor device, the device including a rigid frame on which a flexible diaphragm is supported, first and second elongate supports extending from said diaphragm and disposed in a parallel configuration, first and second elongate laminar members disposed in a common plane end to end between the supports and each supported adjacent its transverse axis lying in said plane by filaments extending from the supports, a flexible coupling linking the adjacent ends of the elongate members, and optical means for applying energy to the coupling whereby, in use, the elongate members are driven into oscillation each in a plane perpendicular to said common plane and to its transverse axis and each in an identical oscillatory mode at its natural resonant frequency.

2. A sensor device as claimed in claim 1 wherein the device is so constructed that, in use, the elongate laminar members oscillate an antiphase in a see-saw mode.

3. A sensor device as claimed in claim 2, wherein each said elongate laminar member has an opening or cut-out adjacent the coupling whereby flexibility of the coupling is enhanced.

4. A sensor device as claimed in claim 1, and provided with an evacuated housing.

5. A pressure sensor system provided with a sensor device as claimed in claim 1.

* * * * *